(12) United States Patent
Kasahara et al.

(10) Patent No.: US 10,293,448 B2
(45) Date of Patent: May 21, 2019

(54) TOOL SHAPE MEASUREMENT APPARATUS AND MACHINE TOOL

(71) Applicant: MAKINO MILLING MACHINE CO., LTD., Tokyo (JP)

(72) Inventors: Tadashi Kasahara, Aiko-gun (JP); Kenichi Ohata, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 147 days.

(21) Appl. No.: 15/548,923

(22) PCT Filed: Feb. 13, 2015

(86) PCT No.: PCT/JP2015/053974
§ 371 (c)(1),
(2) Date: Aug. 4, 2017

(87) PCT Pub. No.: WO2016/129103
PCT Pub. Date: Aug. 18, 2016

(65) Prior Publication Data
US 2018/0015585 A1    Jan. 18, 2018

(51) Int. Cl.
| | | |
|---|---|---|
| G01B 11/24 | (2006.01) |
| B23Q 17/24 | (2006.01) |
| B23Q 3/155 | (2006.01) |
| B23Q 11/08 | (2006.01) |
| B23Q 3/157 | (2006.01) |

(52) U.S. Cl.
CPC ........ B23Q 17/2457 (2013.01); B23Q 3/155 (2013.01); B23Q 3/15526 (2013.01); B23Q 3/15722 (2016.11); B23Q 11/08 (2013.01); B23Q 17/249 (2013.01); G01B 11/24 (2013.01)

(58) Field of Classification Search
CPC ............ B23Q 17/2457; B23Q 3/15722; B23Q 3/155; B23Q 3/15526; B23Q 11/08; B23Q 17/249; G01B 11/24
See application file for complete search history.

(56) References Cited

U.S. PATENT DOCUMENTS 9,965,839 B2 * 5/2018 Yasuda ................ B65G 47/846

FOREIGN PATENT DOCUMENTS

| CN | 102581700 | 7/2012 |
|---|---|---|
| EP | 1477274 A2 | 11/2004 |
| JP | 6-134638 | 5/1994 |
| JP | 2004-338084 | 12/2004 |
| JP | 2009-2780 | 1/2009 |

OTHER PUBLICATIONS

International search report dated Mar. 31, 2015, directed to PCT Application No. PCT/JP2015/053974; 2 pages.

* cited by examiner

*Primary Examiner* — Roy M Punnoose
(74) *Attorney, Agent, or Firm* — Morrison & Foerster LLP (57) ABSTRACT

A tool shape measurement apparatus for imaging a tool is provided with: a camera for imaging the tool disposed at a previously determined imaging position; a shutter disposed on the opposite side of the tool from the camera; an illuminating device for shining light toward the shutter; and a control device for calculating the shape of the tool from an image of the tool. The illuminating device is disposed so that an image in which the tool is darker than the background of the tool is captured due to light reflected at the reflecting surface of the shutter.

7 Claims, 4 Drawing Sheets

TOOL SHAPE MEASUREMENT APPARATUS AND MACHINE TOOL

CROSS-REFERENCE TO RELATED APPLICATIONS

This application is a U.S. National Stage Patent Application of International Application No. PCT/JP2015/053974, filed Feb. 13, 2015, which is hereby incorporated by reference in the present disclosure in its entirety.

FIELD OF THE INVENTION

The present invention relates to a tool shape measurement device and a machine tool.

BACKGROUND OF THE INVENTION

When workpieces are machined with a machine tool, several types of tools may be used for machining one workpiece. When the several types of tools are used for machining, a machine tool provided with a tool exchange device configured to exchange tools is used. The tool exchange device can exchange tools automatically, for example, according to a machining program.

The tools may be broken while machining workpieces. It is known that the machine tool is provided with a tool shape measurement device in order to confirm soundness of tools. The tool shape measurement device can determine whether or not tools are damaged by measuring shapes of the tools. The shape of the tool includes, for example, a tool length and a tool diameter. Items for inspection of the tool shape include partial damages or breakages of surfaces of the tools.

The contact type device that measures shapes of tools by bringing a probe or the like into contact with the surfaces of the tools is known as an example of tool shape measurement devices. The image pickup type device that captures an image of the shape of the tool with a camera and calculates the shape of the tool by analyzing the captured image is known as an example of tool shape measurement devices.

Japanese Unexamined Patent Publication No. 6-134638A discloses a pattern collation and recognition apparatus for tools that includes a photographing device such as a CCD camera disposed so as to face a measurement position in a magazine and an illumination device disposed so as to oppose the photographing device. In addition, it is disclosed that illumination device illuminates the tool from behind by using a diffuser panel. Furthermore, it is disclosed that the photographing device captures a tool pattern image formed by backlight of the tools.

CITATION LIST

Patent Literature 1: Japanese Unexamined Patent Publication No. 6-134638A

SUMMARY OF THE INVENTION

The tool shape measurement device of image pickup type has less number of movable parts and thus is more reliable than the tool shape measurement device of contact type. The tool shape measurement device of image pickup type has a feature that a shape of the tool can be measured at a higher speed than the tool shape measurement device of contact type. For example, the machine tool provided with the tool exchange device measures the shape of the tool after machining by the predetermined tool.

In the device disclosed in the above-described Japanese Unexamined Patent Publication No. 6-134638A, an illumination device such as fluorescent light or the like irradiates a diffuser panel disposed on a back side of the tool with light. It is disclosed that a frosted glass, an acrylic panel, or the like are used as the diffuser panel. Light passes through the diffuser panel. In a picked up image of the tool, a background of the tool becomes bright and the tool becomes dark. The shapes of the tools are measured by analyzing the dark part of the image.

In the method disclosed in this publication, chips or the like may be adhered to the diffuser panel. The image pickup device for tools is disposed in a tool storage chamber in which a tool magazine, for example, is disposed. The tool storage chamber is isolated by a partition wall from a machining chamber in which workpieces are machined. However, the partition wall is provided with an opening for loading and unloading the tools. Foreign substances such as chips and coolant may enter the storage chamber through the opening and may be adhered to the diffuser panel. Alternatively, chips may be adhered to the tool and thus may enter the tool storage chamber. The foreign substances may be adhered to the diffuser panel as a result of operation of the tool magazine. When the foreign substances are adhered to the diffuser panel, there was a problem that the shadow of the foreign substances may reflect in a bright area in the background of the tool. Consequently, there was a problem that an adverse effect on the measurement of the tools may occur.

A tool shape measurement device of the present invention is the tool shape measurement device mounted on a machine tool and configured to measure a shape of a tool by picking up an image of the tool, including: an image pickup device that picks up an image of the tool disposed at an image pickup position determined in advance; a reflector disposed on a side opposite to the image pickup device with respect to the tool in a direction from the image pickup device toward the tool disposed at the image pickup position; a light source that irradiates a reflective surface of the reflector with light; and a control device that calculates the shape of the tool from the image of the tool picked up by the image pickup device. The light source is disposed at a position at which the image of the tool being darker than a background is captured by light reflected from the reflective surface of the reflector.

In the invention described above, the reflective surface can be formed so as to scatter light, and the reflector can be disposed so that at least part of the light scattered from the reflective surface proceeds toward the image pickup device.

A machine tool of the present invention is the machine tool that is configured to machine a workpiece by relatively moving a spindle on which a tool is attached and a table on which the workpiece is placed, and includes: an image pickup device that captures an image of the tool disposed at an image pickup position determined in advance; a reflector disposed on a side opposite to the image pickup device with respect to the tool in a direction from the image pickup device toward the tool disposed at the image pickup position; a light source that irradiates a reflective surface of the reflector with light; and a control device that calculates a shape of the tool from the image of the tool picked up by the image pickup device.

Preferably, in the invention described above, a partition wall that partitions between a machining chamber in which the workpiece is machined and a tool storage chamber in which the tool is stored is provided, and the reflector is formed by a shutter supported by the partition wall, and the shutter is formed movably with respect to the partition wall.

Preferably, in the invention described above, a removal member that comes into contact with a reflective surface of the shutter so as to remove foreign substances adhered to the reflective surface is provided, and the removal member extends in a direction perpendicular to movement direction of the shutter and slides along the reflective surface when the shutter moves.

In the invention described above, the reflector is preferably formed by an oil pan that is disposed in bottom portion of the tool storage chamber where the tool is stored.

In the invention described above, the reflective surface can be formed so as to scatter light, and the reflector can be disposed so that at least part of the light scattered from the reflective surface proceeds toward the image pickup device.

According to the present invention, the tool shape measurement device of image pickup type and the machine tool that reduce effects of foreign substances such as chips and coolant can be provided.

DETAILED DESCRIPTION OF THE INVENTION

With reference to FIG. 1 to FIG. 6, a tool shape measurement device and a machine tool according to an embodiment will be described. The machine tool of the present embodiment is the tool of a numerically controlled type that performs machining by automatically moving a tool and a workpiece relatively in accordance with a machining program.

Figure 1:
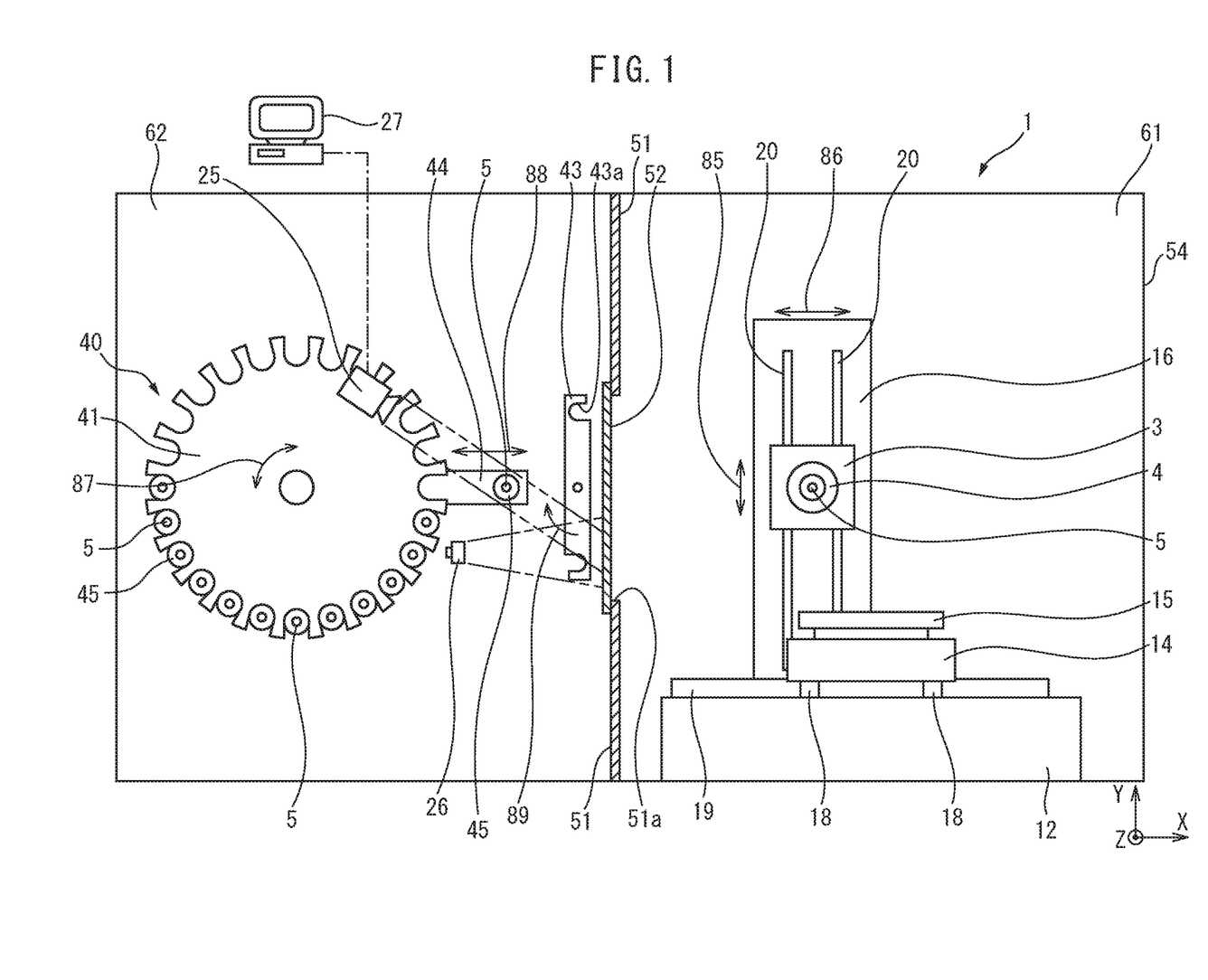
FIG. 1 is a schematic cross-sectional view of first machine tool according to an embodiment.

FIG. 1 is a schematic cross-sectional view of first machine tool according to the present embodiment. The first machine tool 1 is a lateral type machining center. The machine tool 1 includes a movement device that moves the tool and the workpiece relatively to each other. The movement device moves an object to be driven in a plurality of directions of movement axes. The movement axes include an X-axis, a Y-axis, and a Z-axis that are orthogonal to each other as linear feed axes.

The machine tool 1 is provided with a bed 12 which serves as a base table. X-axis guide rails 19 are fixed to an upper surface of the bed 12. A column 16 is disposed on upper surfaces of the X-axis guide rails 19. The column 16 is formed so as to be movable along the X-axis guide rails 19 as indicated by an arrow 86. Y-axis guide rails 20 are fixed to a front surface of the column 16. A spindle head 3 is supported by the Y-axis guide rails 20. The spindle head 3 is configured to be movable along the Y-axis guide rails 20 as indicated by an arrow 85.

Z-axis guide rails 18 are fixed to the upper surface of the bed 12. A table 14 is disposed on upper surfaces of the Z-axis guide rails 18. A workpiece is fixed to the table 14 via a palette 15. The table 14 is formed so as to be movable in a Z-axis direction along the Z-axis guide rails 18.

The spindle head 3 includes a spindle 4. A tool 5 for machining the workpiece is fixed to the spindle 4. A motor for rotating the tool 5 is integrated in the spindle head 3. By the motor being driven, the tool 5 rotates about an axial line of the spindle 4 as a rotational axis.

In the machine tool 1, the tool 5 is moved in the X-axis direction and the Y-axis direction, and the workpiece is moved in the Z-axis direction. The movement device is not limited to this embodiment, and the tool can be moved relative to the workpiece by an arbitrary device. The machine tool may have a rotary feed axis that rotates about a predetermined axial line in addition to the linear feed axes.

The machine tool 1 includes a tool exchange device 40 that automatically exchanges the tool. The machine tool 1 is provided with a machining chamber 61 in which the workpiece is machined and a tool storage chamber 62 in which the tools are stored. The machining chamber 61 and the tool storage chamber 62 are surrounded by a splash guard 54. The machining chamber 61 and the tool storage chamber 62 are isolated by a partition wall 51. The bed 12, the column 16, the spindle head 3 and the like are disposed inside the machining chamber 61. The tool exchange device 40 is disposed inside the tool storage chamber 62. The partition wall 51 is provided with an opening 51a which allows the tools to be moved between the machining chamber 61 and the tool storage chamber 62. A shutter 52 that opens and closes the opening 51a is disposed on the partition wall 51. The shutter 52 is supported by the partition wall 51.

The machine tool 1 includes a motor that drives the shutter 52. The shutter 52 is formed so as to be movable with respect to the partition wall 51. The shutter 52 of the present embodiment is formed so as to be movable in the Z-axis direction. The shutter 52 is moved so as to form opening, whereby the tools 5 can be moved through the opening 51a.

The tool exchange device 40 includes a tool magazine 41 that holds the tools 5, and a carrier device that carries the tools between the tool magazine 41 and the spindle 4. The tool magazine 41 of the present embodiment is formed so as to hold the tools 5 around a base material formed into a disk shape via a tool holder 45. The tool exchange device 40 includes a motor that rotates the tool magazine 41. The tool magazine 41 rotates as indicated by an arrow 87. The carrier device includes a tool shifter 44 and a tool exchange arm 43. The tool shifter 44 moves the tools between the tool magazine 41 and a standby position of the tool. The standby position is a position where the tool can be held by the tool exchange arm 43. The tool shifter 44 moves in a direction indicated by an arrow 88 so as to detach the tools 5 from the tool magazine 41 or attach the tools 5 to the tool magazine 41.

The tool exchange arm 43 is formed into a rod shape. The tool exchange arm 43 includes a retaining part 43a that retains the tools 5 at both end portions thereof. The tool exchange device 40 includes a motor that rotates the tool exchange arm 43. The tool exchange arm 43 is formed so as to be rotatable about the rotation axis that extends in the Z-axis direction as indicated by an arrow 89.

When the tool 5 is exchanged, the spindle head 3 moves to a predetermined position for exchanging the tool 5 in the machining chamber 61. The spindle head 3 moves to a position where the retaining part 43a is capable of retaining the tool 5 attached to the spindle 4 when the tool exchange arm 43 rotates. The tool 5 after machining has completed is attached to the spindle 4. In the tool storage chamber 62, the tool magazine 41 rotates to a position where a tool 5 to be used next is retained by the tool shifter 44. The tool shifter 44 shifts the tool 5 to be used next from the tool magazine 41 to the standby position.

Next, the shutter 52 opens and the tool exchange arm 43 rotates. The tool exchange arm 43 retains the tool 5 retained by the tool shifter 44 and the tool 5 attached to the spindle 4. By a further rotation of the tool exchange arm 43, a tool 5 to be used next is attached to the spindle 4, and the machined tool 5 is attached to the tool shifter 44. The tool shifter 44 returns the tool 5 after machining has completed to the tool magazine 41.

In this manner, the tool exchange device 40 can move the tool 5 attached to the spindle 4 to the tool magazine 41. The tool exchange device 40 is also capable of transferring the tool 5 held by the tool magazine 41 to the spindle 4. After the tool 5 has been exchanged, the tool exchange arm 43 rotates to an initial state. After the shutter 52 has been closed, next process starts in the machining chamber 61.

The tool exchange device is not limited to the embodiment described above, and may be formed in any mode as long as the tool attached to the spindle may be exchanged with the tool held by the tool magazine.

Figure 2:
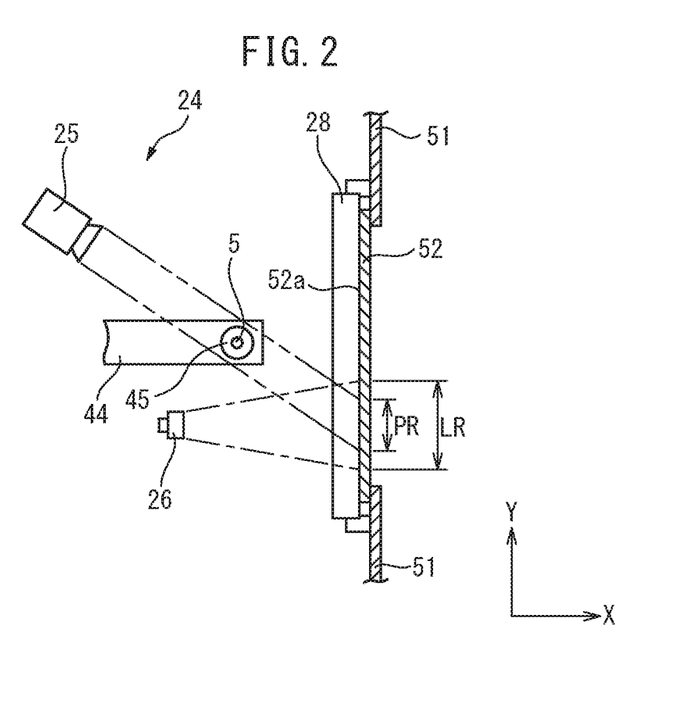
FIG. 2 is a schematic cross-sectional view of first tool shape measurement device according to the embodiment.
Figure 3:
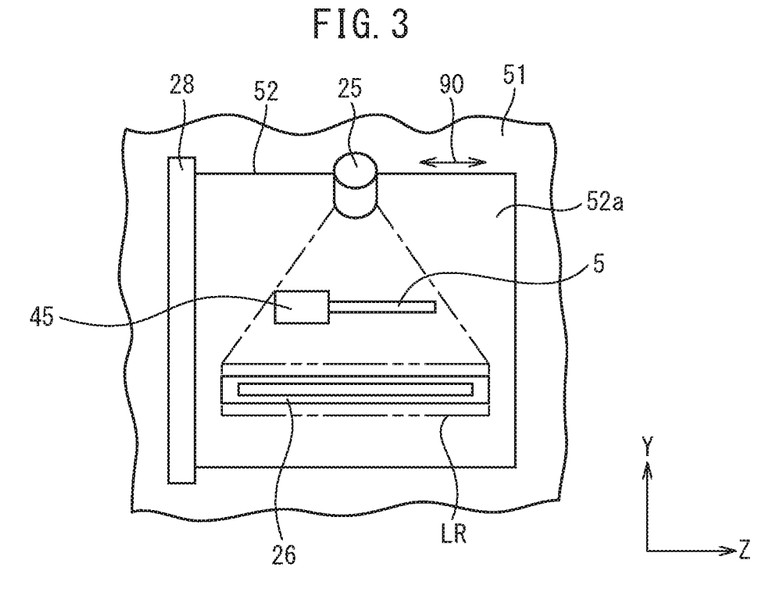
FIG. 3 is a schematic front view of the first tool shape measurement device according to the embodiment.

FIG. 2 illustrates a schematic cross-sectional view of first tool shape measurement device according to the present embodiment. FIG. 3 illustrates a schematic front view of the first tool shape measurement device according to the present embodiment. In FIG. 1 to FIG. 3, a state in which the tool 5 held by the tool shifter 44 is located at the standby position is illustrated. With reference to FIG. 1 to FIG. 3, the machine tool 1 is provided with first tool shape measurement device 24 configured to measure the shape of the tool by picking up an image of the tool 5. The tool shape measurement device 24 is an image pickup type device. The tool shape measurement device 24 employs a back light system in which a background of the tool 5 becomes bright while the tool 5 appears dark in the captured image of the tool 5.

The machine tool 1 of the present embodiment includes a control device 27 that controls the machine tool 1. The control device 27 is provided with an arithmetic processing device which includes, for example, a CPU (Central Processing Unit), a RAM (Random Access Memory), and a ROM (Read Only Memory) connected to one another via a bus. The control device 27 functions as a control device of the tool shape measurement device 24 that analyzes the image that is picked up by the image pickup device. The control device 27 controls the image pickup device that picks up the image of the tool 5 and the tool exchange device 40. The image pickup device includes a camera 25. Any camera that can perform image processing of the captured image such as a CCD (Charge Coupled Device) camera and the like can be employed as the camera 25.

The control device 27 calculates the shape of the tool from the image of the tool 5. Images picked up by the camera 25 are input to the control device 27. The control device 27, for example, binarizes the input image. The control device 27 measures the number of pixels of a portion corresponding to the tool and a portion corresponding to a portion other than the tool. The control device 27 then calculates the shape of the tool based on the number of pixels of the portion corresponding to the tool. The shape of the tool includes a tool length and a tool diameter. The control device 27 determines the soundness of the tool based on the calculated shape of the tool. For example, it is determined whether or not the tool 5 is damaged.

The image pickup device picks up an image of a tool 5 disposed at the predetermined image pickup position inside the tool storage chamber 62. The camera 25 of the present embodiment is disposed so as to capture the image of the tool 5 when the tool 5 is disposed at the standby position. The image pickup position is not limited to the standby position, and may be set to any position. The image pickup device is capable, for example, of photographing the tool immediately after machining has completed. Alternatively, the image pickup device may pick up the image of the tool to be used next.

The shutter 52 of the present embodiment functions as a reflector disposed on a side opposite to the camera 25 with respect to the tool in a direction from the camera 25 toward the tool 5 disposed at the standby position. The shutter 52 is disposed behind the tool 5 when viewed from the camera 25. The camera 25 is disposed at a position so that the substantially entire part of the background of the tool 5 in the image is filled with the shutter 52 when the image of the tool 5 is picked up at the standby position. The shutter 52 is disposed at the position that intersects a line connecting the camera 25 and the tool 5 disposed at the standby position. The tool 5 is disposed between the shutter 52 and the camera 25.

The shutter 52 includes a reflective surface 52a that reflects light. The reflective surface 52a is formed so as to scatter the light. In the present embodiment, a surface facing inside the tool storage chamber 62 among the area maximum surfaces in which areas are largest in the shutter 52, corresponds to the reflective surface 52a. The reflective surface 52a of the shutter 52 in the present embodiment is coated.

The reflector is not limited to the mode described above, and may be configured so as to scatter at least part of the incident light. In other words, any member can be used as the reflector as long as the member does not have mirror surface characteristic in which the almost the entire incident light is reflected in the one direction. For example, the reflector may not be coated on a surface thereof, and may have an exposed metallic surface. The reflector may be formed of any material. Any color may be employed when the surface of the reflector is coated. In particular, bright mat coatings such as a bright gray that is used in an inner wall surface of a sheet-metal cover in the machine tool were effective among various coatings.

The tool shape measurement device 24 is provided with an illumination device 26 as a light source that irradiates light toward the shutter 52. The illumination device 26 of the present embodiment is an LED (Light Emitting Diode) illumination. The shutter 52 scatters light on the reflective surface 52a, and thus part of the light irradiated by the illumination device 26 proceeds to the camera 25. In this manner, the tool shape measurement device 24 of the present embodiment employs an indirect illumination system which illuminates the tool 5 with the reflected diffused reflection light instead of a direct illumination system which directly illuminates the tool 5. The illumination device 26 is disposed so as to capture the image in which the tool becomes darker than the background of the tool with the diffused reflection light that is reflected from the reflective surface 52a of the shutter 52.

The control device 27, for example, causes the illumination device 26 to irradiate for a short time and picks up the image of the tool 5. In the present embodiment, a time length of irradiation with light by the illumination device 26 is around 15 ms. The LED illumination that provides a brightness of 1300 lux at a position 1 m apart from the illumination device 26, for example, may be used as the illumination device 26.

With reference to FIG. 2, a projection area PR may be determined when the tool 5 disposed at the standby position is projected to the shutter 52 from the camera 25. The irradiation area LR that is mainly irradiated with light when the shutter 52 is illuminated by the illumination device 26 may be determined. The irradiation area LR is preferably large enough to include the projection area PR therein.

Figure 4:
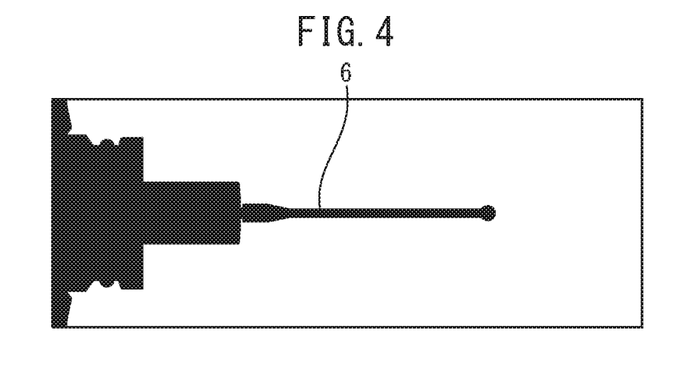
FIG. 4 is an example of an image picked up by an image pickup device according to the embodiment.

FIG. 4 illustrates an example of the image of the tool picked up by the image pickup device of the present embodiment. In the example illustrated in FIG. 4, a probe 6 corresponding to the tool is used. When an image of the tool is picked up, a portion corresponding to the tool appears in black as a whole. In contrast, the background of the tool is brighter due to the diffused reflection light from the reflector. In this manner, the image pickup device picks up the image in which the tool is darker than the background of the tool. For example, when the color of light emitted by the illumination device is white, the background of the tool becomes white and the tool appears in black. The control device has an ability to calculate the shape of the tool by using the image as described above.

In the method of directly illuminating the tool, an image of the tool is picked up in a state in which the entire part of the tool is bright. However, when the tool is illuminated directly, light may reflect significantly at a part of the tool. Consequently, the part of the tool becomes bright, and the shape of the tool as a whole may be blurred. In contrast, in the backlight system of the present embodiment, the portion corresponds to the tool appears dark. Since a part of the tool does not become bright, the shape of the tool may be measured with high degree of accuracy.

With reference to FIG. 1 to FIG. 3, the illumination device 26 preferably includes brightness that makes the image of the entire part of the tool picked up by the camera 25 to be black. In other words, the illumination device 26 is preferably a bright light source generating the brightness which makes the entire part of the tool to be black. By adoption this configuration, an image having a clear shape of the tool appears therein may be obtained and the shape of the tool may be measured more accurately.

In addition, the tool shape measurement device 24 performs image pickup with the diffused reflection light reflected by the shutter 52. When the machine tool 1 is driven, foreign substances such as fine chips, lubricant supplied to the sliding part, or coolant may be adhered to the reflective surface 52a of the shutter 52. However, the foreign substances such as the fine chips reflect light on the surfaces, and accordingly serve as part of the reflector. Therefore, there is the feature that the foreign substances are hardly captured in the background of the tool. In other words, the tool shape measurement device 24 may reduce the probability that chips or the like create shadows and black substances come out in the background of the tool. Consequently, accurate measurement of the shape of the tool can be achieved.

In the tool shape measurement device 24, the reflector which reflects light is formed by the shutter 52. The shutter 52 is moved in the direction indicated by an arrow 90 (see FIG. 3) when the tool is exchanged. Even when large-sized foreign substances are adhered to the reflective surface 52a of the shutter 52, the large-sized foreign substances drop off as the shutter 52 moves. Therefore, it is possible to restrain the foreign substances from being picked up in the background of the tool in the picked up image.

The shutter 52 of the present embodiment extends in a direction that is perpendicular to the reflective surface 52a. In other words, the shutter 52 is supported by the partition wall 51 in an upright state. Therefore, the shutter 52 has a feature that the foreign substances easily drop off due to an action of gravitational force even when the foreign substances are adhered to the reflective surface 52a of the shutter 52. In this manner, the reflector is preferably disposed so that the reflective surface stands upright.

Furthermore, the tool shape measurement device 24 includes a brush 28 serving as a removal member that comes into contact with the reflective surface 52a of the shutter 52 so as to remove the foreign substances adhered to the reflective surface 52a. The brush 28 is formed into a rod shape. The brush 28 extends in a direction perpendicular to the movement direction of the shutter 52 indicated by the arrow 90. The brush 28 extends in the Y-axis direction. A length of the brush 28 is longer than the length of the shutter 52 in the Y-axis direction. The brush 28 has a length that comes into contact with the shutter 52 from one end to the other end thereof in the direction perpendicular to the movement direction of the shutter 52.

When the tool 5 attached to the spindle 4 is exchanged with the tool 5 held by the tool magazine 41, the shutter 52 moves in a direction indicated by the arrow 90, and the brush 28 slides on the reflective surface 52a of the shutter 52 so as to remove the foreign substances. In this manner, by the provision of the brush 28, the foreign substances adhered to the reflective surface 52a of the shutter 52 can be removed even when a specific brush drive mechanism for removing the foreign substances is not provided. In particular, the brush 28 can remove large-sized foreign substances.

The removal member for removing the foreign substances is not limited to the brush, and any member that removes the foreign substances adhered to the reflective surface may be employed. For example, a lip seal formed of rubber can be employed as the removal member. The lip seal includes a rubber plate extending in a rod shape. The foreign substances adhered to the reflective surface of the shutter may be removed by the rubber plate sliding on the reflective surface as the shutter moves. In the present embodiment, the reflector moves while the removal member is fixed. However, the mode is not limited thereto, and any mode is applicable as long as the removal member is formed so as to be movable relative to the reflector. For example, the removal member may be formed so as to be movable.

Any illuminations may be employed as the illumination device 26 in addition to the LED illumination. By adopting the LED illumination such as the illumination device 26, brightness may be increased in a short time. Therefore, time that is needed for picking up the image may be shortened. In addition, the LED illumination allows the illumination device to be downsized in comparison with other illumination devices.

The illumination device 26 is preferably disposed at a position where chips or the like are hardly adhered. For example, the illumination device 26 is preferably disposed so that a back surface faces the tool magazine 41. Alternatively, the illumination device 26 preferably includes a device that removes the foreign substances adhered to the surface that emits light. For example, a device that ejects cleaning liquid onto the surface of the illumination device 26 can be employed as the device that removes the foreign substances. The camera 25 is preferably disposed at a position higher than the image pickup position of the tool 5 when performing image pickup. Although there is a probability that the foreign substances adhered to the tool 5 in the machining chamber drop off from the tool 5 in the vicinity of the image pickup position, with the configuration described above, adhesion of the foreign substances onto a surface of a lens of the camera 25 is restricted. The reflector is disposed at a position lower than the image pickup position of the tool 5, so that the image pickup device can pick up the image of the tool 5 desirably as described above even when the foreign substances dropped off from the tool 5 are adhered thereto.

Figure 5:
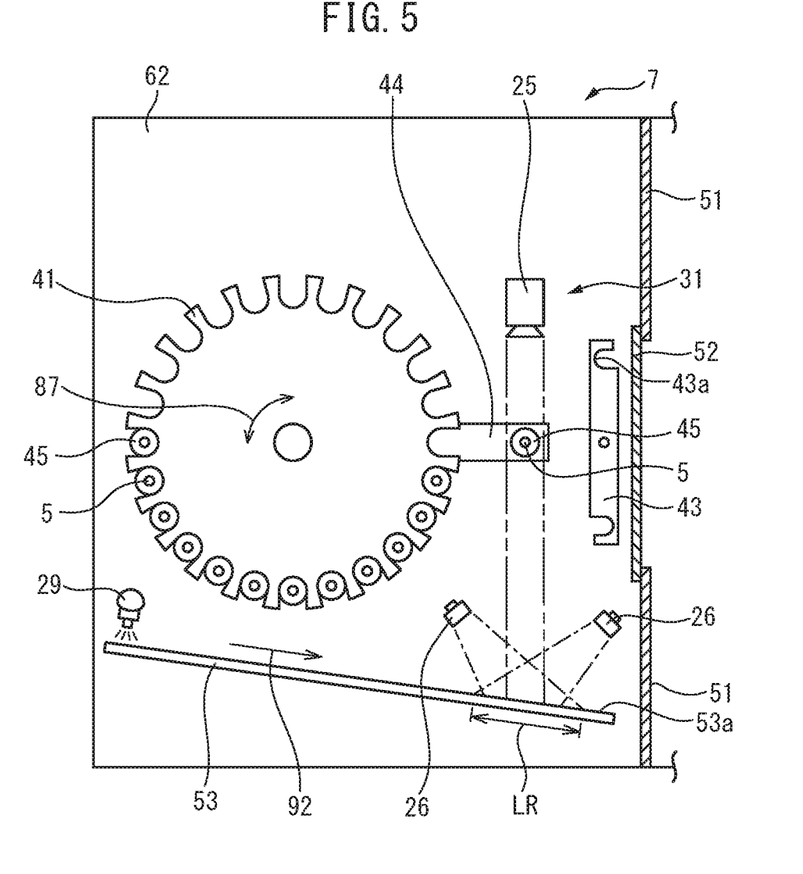
FIG. 5 is a schematic cross-sectional view of a portion of a tool storage chamber of second machine tool according to the embodiment.

FIG. 5 illustrates a schematic view of second machine tool according to the embodiment. FIG. 5 is a schematic cross-sectional view of a portion including the tool storage chamber 62. The second machine tool 7 includes second tool shape measurement device 31. A reflector of the tool shape measurement device 31 is formed by an oil pan 53 disposed on a bottom portion of the tool storage chamber 62. The oil pan 53 is formed into a plate shape. The oil pan 53 has a function of receiving foreign substances such as chips, lubricant, coolant, or the like that drops off from the device disposed in the tool storage chamber 62 on the surface thereof and flowing the foreign substances to a predetermined position. In the tool shape measurement device 31, the camera 25 is disposed so as to pick up the image of the tool 5 disposed at the standby position from an upper side in a vertical direction. In the tool shape measurement device 31, the upper surface of the oil pan 53 corresponds to the reflective surface 53a that reflects light. The illumination device 26 irradiates part of the reflective surface 53a of the oil pan 53 with light so that the background of the tool 5 becomes bright.

Liquid such as the coolant flows on the reflective surface 53a of the oil pan 53. The liquid has a property of scattering light from a surface thereof. Therefore, even though liquid exists in the irradiation area LR illuminated with light, the liquid has a property of hardly coming out in the background of the tool. Consequently, even when the liquid flows on the surface of the oil pan 53, the image of the tool may be picked up desirably. Since the reflective light is used for picking up the image as described above in the present embodiment, the effects of the small-sized foreign substances can also be restricted.

The machine tool 7 is provided with a cleaning liquid supply device that flows the cleaning liquid on the reflective surface 53a of the oil pan 53. The cleaning liquid supply device includes a cleaning liquid nozzle 29. The cleaning liquid supplied from the cleaning liquid nozzle 29 is caused to flow by an inclination of the oil pan 53 as indicated by an arrow 92. The cleaning liquid cleans the reflective surface 53a. Accordingly, large-sized foreign substances remaining on the reflective surface 53a of the oil pan 53 can also be removed. When the cleaning liquid supply device is disposed, the removal member that removes the foreign substances adhered to the reflective surface 53a of the oil pan 53 does not need to be disposed.

The tool shape measurement device 31 includes a plurality of the illumination devices 26. The light source includes first light source and second light source that are disposed at positions different from each other. By arranging a plurality of the illumination devices 26, the reflector can be irradiated from the multiple directions. Consequently, creation of shadows of the large-sized foreign substances can be restricted. Appearance of black substances in the background of the tool in the image is restricted. Alternatively, by arranging a plurality of the illumination devices 26, the background of the tool in the image may be brightened, and color unevenness or the like generated in the background of the tool in the image can be restricted. Consequently, the shape of the tool can be measured accurately. Other configurations, actions, and advantageous effects are the same as those of the first machine tool, and thus explanations are not repeatedly described here.

Figure 6:
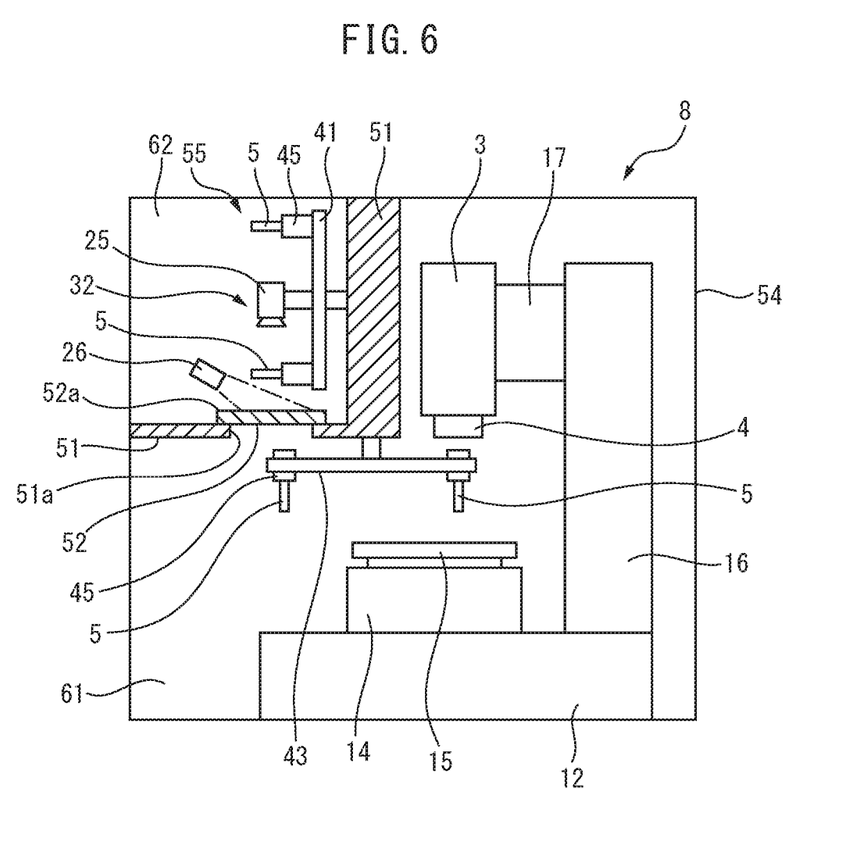
FIG. 6 is a schematic cross-sectional view of a third machine tool according to the embodiment.

FIG. 6 illustrates a schematic cross-sectional view of a third machine tool provided with a third tool shape measurement device according to the present embodiment. The machine tool described above is a horizontal-type machine tool that has the spindle 4 extending in a horizontal direction. A third machine tool 8 is a vertical-type machine tool. The machine tool 8 is provided with the column 16 which stands upright on a surface of the bed 12. The column 16 supports the spindle head 3 via a saddle 17. In the example illustrated in FIG. 6, the saddle 17 is formed so as to move in a vertical direction. The spindle 4 disposed in the interior of the spindle head 3 is formed so as to extend in the vertical direction.

The machine tool 8 is provided with second tool exchange device 55. The tool exchange device 55 is provided with a disk-shaped tool magazine 41. The tool 5 is held in the tool magazine 41 via the tool holder 45. The tool exchange device 55 includes a tool transfer member that transfers the tool between the tool magazine 41 and the tool exchange arm 43. In the tool exchange device 55, the tool exchange arm 43 extends in the horizontal direction. The tool exchange arm 43 rotates in a horizontal plane. The tool exchange arm 43 removes the tool 5 from the spindle 4 and attaches the tool 5 to the spindle 4. The tool exchange arm 43 removes the tool 5 from the tool transfer member and attaches the tool 5 to the tool transfer member.

A machining chamber 61 surrounded by a splash guard 54 is formed in the machine tool 8. The partition wall 51 is formed above the table 14. The tool storage chamber 62 is defined by a space partitioned by the partition wall 51. The shutter 52 for opening and closing the opening 51a is disposed on the partition wall 51. The shutter 52 is disposed so as to extend in the horizontal direction. In the machine tool 8, the shutter 52 moves in the horizontal direction.

The machine tool 8 is provided with a third tool shape measurement device 32. The illumination device 26 is disposed on a lateral side of the shutter 52. The camera 25 picks up the images of the tools 5 attached to the tool magazine 41. The camera 25 is disposed so as to pick up the image of the tool 5 disposed at the predetermined image pickup position. The tool shape measurement device 32 is capable of picking up the image of the tool 5 that is returned to the tool magazine 41, for example, after machining has completed.

In this manner, the tool shape measurement device of the present invention may be applied to a vertical-type machine tool. The shutter serving as the reflector may be disposed so as to extend in the horizontal direction. The image pickup device may pick up an image in a state in which the tool is held in the tool magazine. Other configurations, actions, and advantageous effects are the same as those of the first machine tool or the second machine tool, and thus explanations are not repeatedly described here.

The embodiments described above may be combined as needed. In the respective drawings described above, the same or equivalent portions are denoted by the same reference numerals. The above-described embodiments are examples only, and are not intended to limit the invention. In the embodiments, modification of the modes described in claims are included.

REFERENCE SIGNS LIST 1, 7, 8 machine tool
5 tool
24, 31, 32 tool shape measurement device
25 camera
26 illumination device
27 control device
28 brush
51 partition wall
52 shutter 52a reflective surface
53 oil pan
53a reflective surface
61 machining chamber
62 tool storage chamber

The invention claimed is:

1. A tool shape measurement device mounted on a machine tool and configured to measure a shape of a tool by picking up an image of the tool, the tool shape measurement device comprising:
    an image pickup device that picks up the image of the tool disposed at a predetermined image pickup position;
    a reflector disposed on a side opposite to the image pickup device with respect to the tool in a direction from the image pickup device toward the tool disposed at the image pickup position;
    a light source that irradiates a reflective surface of the reflector with light; and
    a control device that calculates the shape of the tool from the image of the tool picked up by the image pickup device, wherein
    the light source is disposed at a position at which the image in which the tool is darker than a background is captured by light reflected from the reflective surface of the reflector.

2. The tool shape measurement device according to claim 1, wherein
    the reflective surface is formed so as to scatter light, and
    the reflector is disposed so that at least a part of light scattered at the reflective surface proceeds toward the image pickup device.

3. A machine tool configured to machine a workpiece by relatively moving a spindle on which a tool is attached and a table on which the workpiece is placed, the machine tool comprising:
    an image pickup device that picks up an image of the tool disposed at a predetermined image pickup position;
    a reflector disposed on a side opposite to the image pickup device with respect to the tool in a direction from the image pickup device toward the tool disposed at the image pickup position;
    a light source that irradiates a reflective surface of the reflector with light; and
    a control device that calculates a shape of the tool from the image of the tool picked up by the image pickup device.

4. The machine tool according to claim 3, further comprising a partition wall that partitions between a machining chamber in which the workpiece is machined and a tool storage chamber in which the tool is stored, wherein
    the reflector is formed by a shutter supported by the partition wall, and
    the shutter is formed so as to be movable with respect to the partition wall.

5. The machine tool according to claim 4, further comprising a removal member that comes into contact with the reflective surface of the shutter and is formed so as to remove foreign substances adhered to the reflective surface of the shutter, wherein
    the removal member extends in a direction perpendicular to movement direction of the shutter and slides on the reflective surface as the shutter moves.

6. The machine tool according to claim 3, wherein
    the reflector is formed by an oil pan disposed in bottom portion of the tool storage chamber in which the tool is stored.

7. The machine tool according to claim 3, wherein
    the reflective surface is formed so as to scatter light, and
    the reflector is disposed so that at least a part of light scattered at the reflective surface proceeds toward the image pickup device.

* * * * *